Jan. 28, 1947. A. A. KUBITZ 2,415,013
PORTABLE ELEVATING CONVEYER
Filed Dec. 15, 1945 3 Sheets-Sheet 1
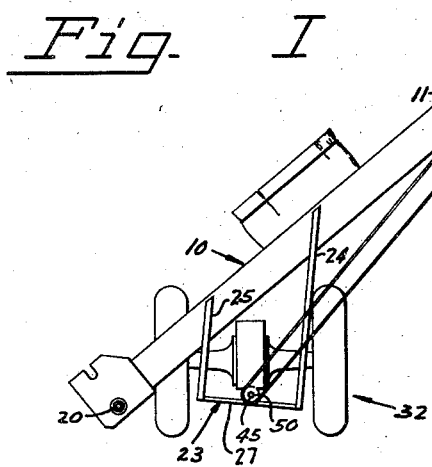
Fig. I
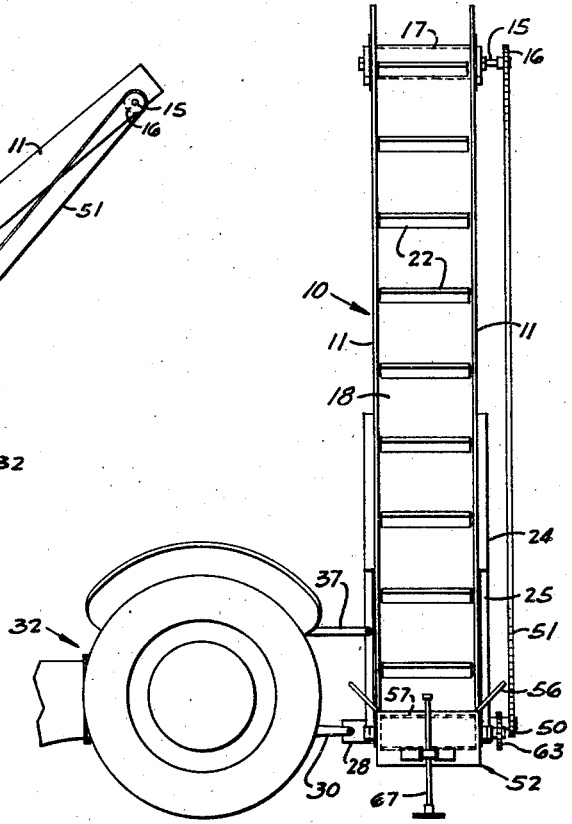
Fig. III
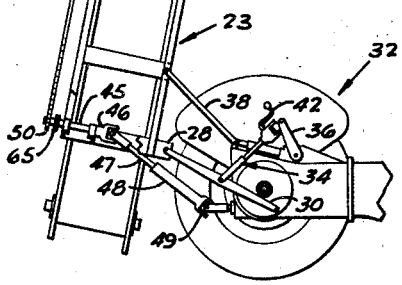
Fig. II
INVENTOR.
Arnold A. Kubitz
BY
Marshall & Marshall
ATTORNEYS

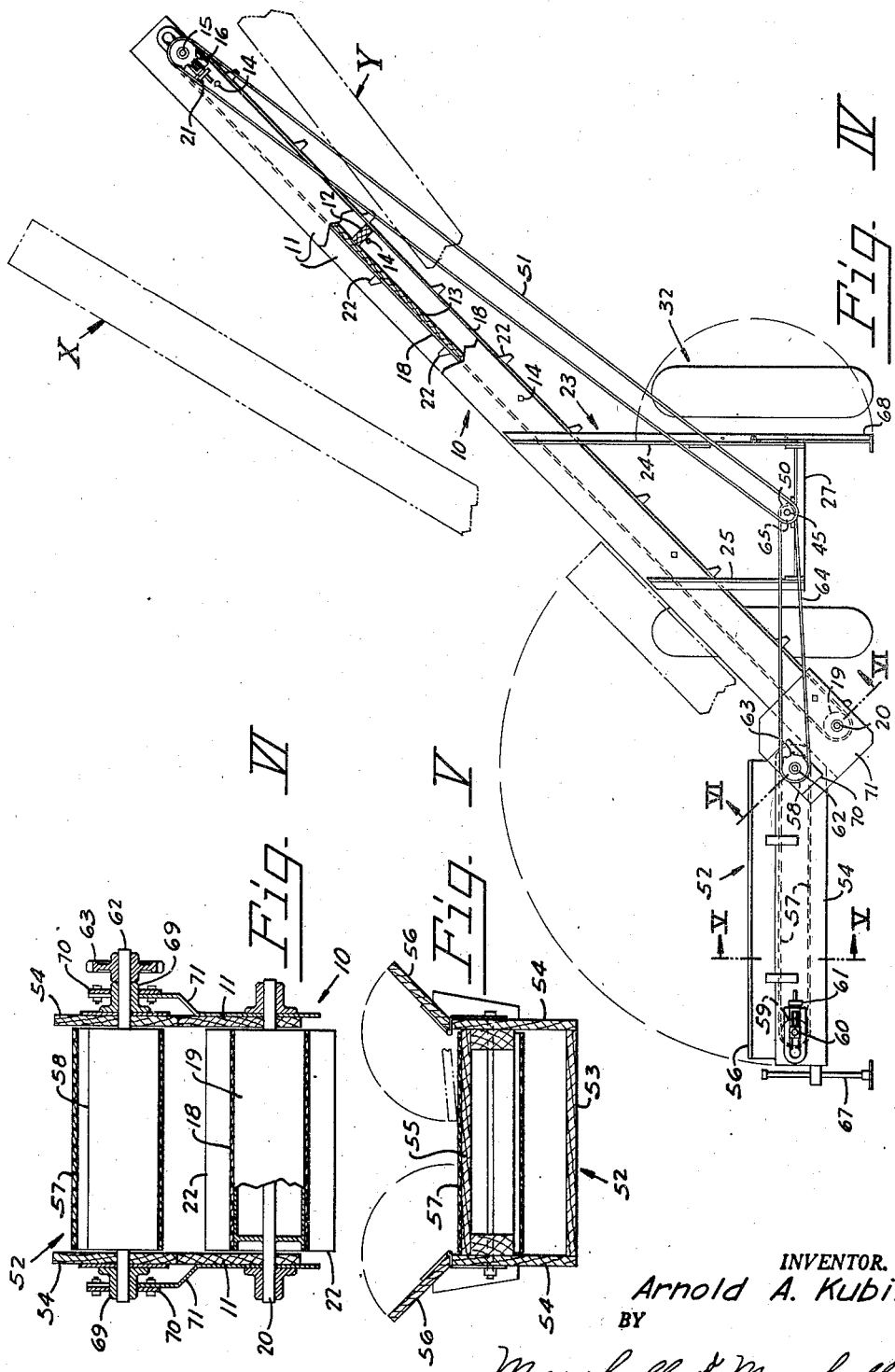

Jan. 28, 1947. A. A. KUBITZ 2,415,013
PORTABLE ELEVATING CONVEYER
Filed Dec. 15, 1945 3 Sheets-Sheet 3
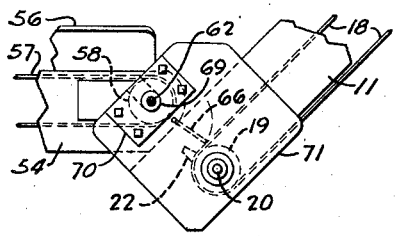
Fig. IX
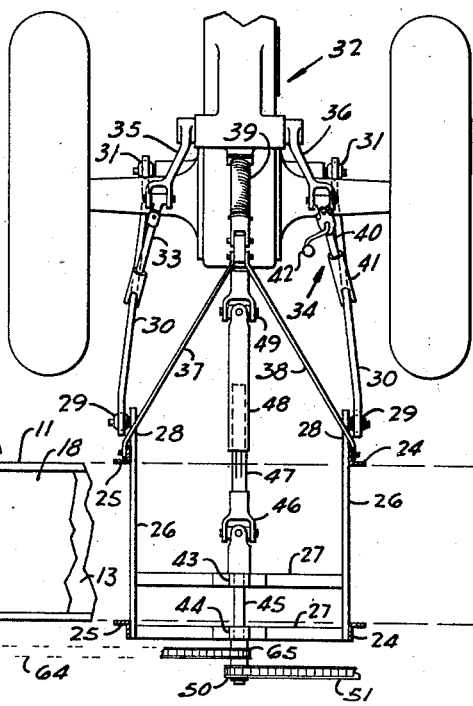
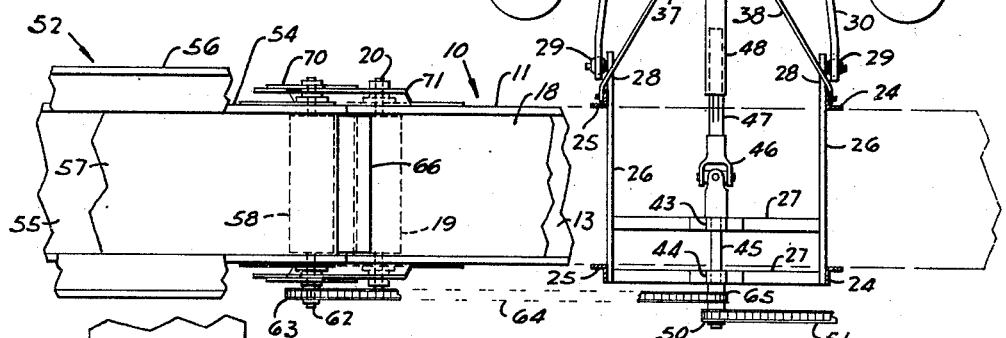
Fig. VII
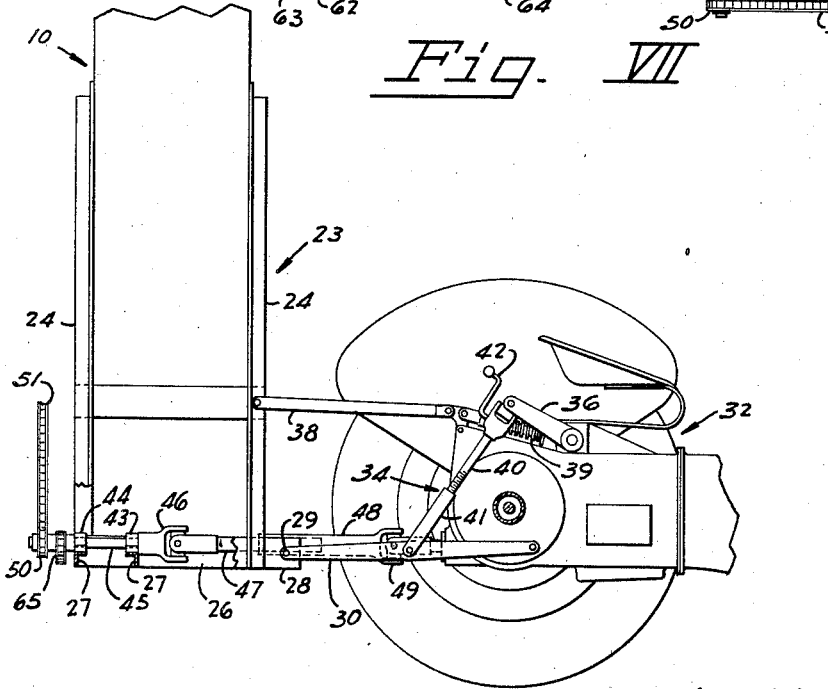
Fig. VIII
INVENTOR.
Arnold A. Kubitz
BY
Marshall and Marshall
ATTORNEYS Patented Jan. 28, 1947

2,415,013

UNITED STATES PATENT OFFICE 2,415,013

PORTABLE ELEVATING CONVEYER

Arnold A. Kubitz, Toledo, Ohio

Application December 15, 1945, Serial No. 635,286

4 Claims. (Cl. 198—233)

This invention relates to portable elevating conveyers for agricultural produce, and particularly to elevating conveyers adapted to be transported by farm tractors and to be operated by so-called power take-offs which are included in the mechanisms of many tractors.

It is an object of the invention to provide an elevating conveyer so organized and constructed that it can be connected to a tractor to extend transversely thereof and to convey produce from a low level at one side of the tractor to a higher level at the other side thereof.

Another object of the invention is to provide an elevating conveyer which may be so connected to a tractor that it may be lifted and carried about; the center of mass of the conveyer being shifted toward a point above the tractor when the conveyer is lifted into position to be carried, thereby minimizing strains on the conveyer and on the means connecting it to the tractor.

A further object is to provide a portable elevating conveyer which may be operated while the conveyer is being carried about by a tractor to convey produce from near ground level at one side of the tractor to a truck accompanying the tractor at its other side.

Still another object is to provide a portable elevating conveyer which may be tilted to bring the delivery end of the conveyer to various levels.

Still a further object is to provide a portable conveyer with a feeder that is detachable and that, when attached, is foldable to facilitate transportation.

And an important general object is to provide a conveyer which not only is capable of accomplishing the objects heretofore specified but which is adapted to handle produce of such diverse characteristics as baled hay, beets and potatoes, corn on the cob, shelled corn and small grain, either threshed or in bundles, and is adapted to deliver such produce into moving trucks as well as onto stacks and into stationary mows and bins.

Other objects and advantages will be apparent from the following description, in which reference is had to the accompanying drawings illustrating a preferred embodiment of the invention and wherein similar reference numerals designate similar parts throughout the several views.

In the drawings:

Fig. I is a rear elevational view illustrating a portable elevating conveyer embodying the instant invention, the conveyer being shown as so connected to a tractor that the conveyer may be operated while being transported, a bale of hay being indicated in mid-position between the receiving and discharge ends of the elevator;

Fig. II is a right side elevational view showing the conveyer as lifted and swung forwardly into position to be carried by the tractor, a part of the tractor being broken away;

Fig. III is a left side elevational view on a somewhat larger scale illustrating the portable elevating conveyer operatively connected to a tractor a part of which is broken away, the conveyer being equipped with a feeder one end of which is supported by an adjustable foot, the apparatus as illustrated in this figure being in condition to be operated while stationary;

Fig. IV is a rear elevational view, on the same scale as Fig. III, illustrating the conveyer equipped with the feeder and in condition to be operated while stationary, the manner in which the feeder and in which a supporting leg may be folded and the manner in which the elevator may be tilted to raise or lower its delivery end being shown in broken lines;

Fig. V is a further enlarged sectional view taken as indicated by the broken line V—V of Fig. IV;

Fig. VI is a similarly enlarged sectional view taken as indicated by the broken line VI—VI of Fig. IV;

Fig. VII is a plan view, enlarged to a scale intermediate between that of Fig. III and that of Fig. V, illustrating the mechanism by means of which the conveyer is connected to a tractor, parts being broken away;

Fig. VIII is a right side elevational view also illustrating the mechanism by which the conveyer is connected to a tractor, parts being broken away; and Fig. IX is a similarly enlarged fragmentary rear elevational view illustrating the manner in which the feeder is connected to the elevator.

Referring to the drawings in detail, the elevator 10 comprises a chute constructed with parallel side rails 11 which are spaced from each other by joists 12 upon which is laid a floor 13. The side rails 11, the joists 12 and the floor 13, which may be wood or metal, are rigidly secured together by suitable means. If wood construction is employed, long bolts 14 may be used to tie the side rails 11 together and to hold them against the ends of the joists 12.

The side rails 11 extend above and beyond the ends of the floor 13, and journaled in suitable bearings, adjustably mounted at the upper ends of the side rails 11, is a shaft 15, fixed to which are a sprocket wheel 16 and a roller 17.

An endless belt 18 overlies the floor 13 and is slidable therealong. The upper bight of the belt 18 extends around the roller 17, while the lower bight of the belt extends around a roller 19 mounted on a shaft 20 which is journaled in suitable bearings in the lower ends of the side rails 11. The tension of the belt may be adjusted by means of adjusting nuts 21 which may be turned to move the bearings in which the shaft 15 is journaled.

Transverse cleats 22 are secured to the belt 18 at intervals along its length and when the roller 17 is turned clockwise (as viewed from the rear) the cleats 22 move upwardly in the chute formed by the side rails 11 and the floor 13.

Secured to the elevator 10 is a supporting frame 23 which, in the form of device shown, is constructed of a pair of long uprights 24 and a pair of short uprights 25, all the uprights being of angle section. The lower ends of each of the pairs of uprights are connected together by side bars 26, and the side bars 26 are spaced and connected to each other by crossbars 27, which also may be of angle section. The members above enumerated of the frame 23 are rigidly secured together by welding or other suitable means.

Pivotally connected to forwardly extending ends 28 of the side bars 26, by means of ball joints 29, are the rear ends of a pair of lifting arms 30 the forward ends of which are connected by means of ball joints 31 to the frame of a tractor 32. Pivotally connected to each of the lifting arms 30 about midway between its ends are the lower ends of lifting links 33 and 34, the upper ends of the lifting links being pivoted to lifting cranks 35 and 36 which can be swung upwardly or downwardly by mechanism of the tractor 32. The specific mechanism that operates the lifting arms 35 and 36 is not a part of the instant invention and therefore is not shown.

The supporting frame 23 is connected to the frame of the tractor 32 by a pair of steadying links 37 and 38, the steadying link 37 being pivoted to the foremost short upright 25, while the steadying link 38 is pivoted to the foremost long upright 24. As they extend forwardly the steadying links 37 and 38 converge to a pivotal connection with the tractor frame 32, where some shock absorbing flexibility is attained with the aid of a spring 39.

The steadying links 37 and 38 are shorter than the lifting arms 30. Hence the pivotal connections between the steadying links and the supporting frame 23 swing through shorter arcs than the pivotal connections between the lifting arms 30 and the supporting frame 23. This causes the elevator 10 to lean forwardly as it is lifted, carrying the center of mass of the conveyer to a position in which the connections to the tractor are subjected to less stress than would be the case in the absence of the shift of the center of mass (see Fig. II).

The right lifting link 34 is made extensible. It includes a screw 40 which is threaded into a socket 41 and is capable of being turned by means of a handle 42 to lengthen or shorten the lifting link 34. By shortening the lifting link 34 the delivery end of the elevator 10 may be raised to the broken line position indicated at X in Fig. IV, and by lengthening the lifting link 34 the elevator 10 may be tilted to the broken line position indicated at Y in Fig. IV. The elevator may be tilted thus when it is in the lowered position shown in Fig. I or when it is in the raised position shown in Fig. II.

Mounted upon the crossbars 27 are a pair of bearings 43 and 44 within which is journaled a rotatable shaft 45 having fixed upon its forward end one yoke of a universal joint 46, the other yoke of the universal joint being fixed to a shaft section 47 that has a splined connection with a shaft section 48, the shaft section 48 being connected by a second universal joint 49 to the so-called power take-off of the tractor 32. Because of the flexibility permitted by the universal joints 46 and 49 and the splined connection between the shaft sections 47 and 48, the shaft 45 is automatically extensible and can be rotated by the power take-off when the conveyer is raised somewhat as well as when it is in its lowermost position and regardless of the position into which the elevator is tilted.

Fixed upon the rear end of the rotatable shaft 45 is a sprocket wheel 50 which drives a chain 51 that extends to and turns the sprocket wheel 16, thus moving the belt 18 and cleats 22 to elevate such produce as is being handled.

It sometimes is desirable to operate the conveyer while it is being carried over a field. Contractors who bale hay and straw may leave the bales scattered, an extra charge being made if the bales are accumulated in piles. With a conveyer embodying the instant invention in the condition in which it is shown in Fig. I, the conveyer may be transported to the scattered bales, which may be upended one by one onto the belt 18, elevated and dumped into a truck as it moves along on the other side of the tractor.

The elevating conveyer finds its most frequent use, however, while temporarily stationed near a pile of produce to be loaded into a truck or while temporarily stationed at a bin, mow or stack. For handling root crops or grain at temporary stations, the conveyer is equipped with a feeder 52.

The feeder 52 has a box-like body with a bottom 53, sides 54 and an upper floor 55. Side extensions 56, hinged to the upper edges of the sides 54, when opened cooperate with the floor 55 to form an elongated hopper, and a belt 57, which slides over the floor 55 and passes around rollers 58 and 59, serves to carry produce to the lower end of the elevator 10.

The roller 59 is fixed upon a shaft 60 which is journaled in bearings that may be adjusted to change the tension of the belt 57 by turning adjusting nuts 61. The roller 58 is fixed upon a shaft 62 which carries a sprocket wheel 63 fixed to its outer end, and a chain 64 extends over the sprocket wheel 63 and a driving sprocket wheel 65 which is fixed upon the rotatable shaft 45 that is turned by the power take-off of the tractor.

Hence, when produce such as potatoes, corn on the cob, shelled corn or threshed small grain is scooped onto the feeder 52, it is carried by the belt 57 to the lower end of the elevator 10. In order to keep produce such as shelled corn and threshed small grain from spilling through the gap between the belt 57 and the belt 18 a flap 66 is hung from the feeder to the belt 18, the flap being hung by means of pintles which let it swing upwardly to permit passage of the cleats 22.

In order that the stability of the conveyer may be increased when it is temporarily located at a station, the feeder 52 is provided with an adjustable foot 67, and the supporting frame 23 also is provided with a foot 68 which may be turned down to engage the ground in the manner indicated in Fig. IV.

When it is desired to transport the elevating conveyer to or from a station, the feeder may be tipped over upon the elevator into the position indicated in broken lines in Fig. IV. It is possible thus to tip the feeder over upon the elevator because the feeder is provided with round bosses 69 which are turnably mounted in round openings cut in plates 70 that are bolted to brackets 71 formed of heavy sheet metal and secured to the lower end of the elevator 10.

The bosses 69 are received in notches opening through the edges of the brackets 71, and the plates 70 are removably bolted to the brackets 71 so that the feeder may be detached when occasion requires.

The embodiment of the invention herein shown and described is to be regarded as illustrative only, and it is to be understood that the invention is susceptible to variation, modification and change within the spirit and scope of the subjoined claims.

Having described the invention, I claim:

1. A portable elevating conveyer adapted to be transported by and operated by a tractor having a pair of lifting arms with means for raising and lowering both said lifting arms and means for raising and lowering one only of said lifting arms and also having a power take-off, said portable elevating conveyer including a chute, a frame supporting said chute, means for pivotally connecting said frame to the lifting arms of said tractor, steadying linkage for connecting said supporting frame to the frame of said tractor, said chute extending transversely of the path of movement of said tractor when said supporting frame is connected to the lifting arms of said tractor and is connected by said steadying linkage to the frame of said tractor, said portable elevating conveyer being bodily liftable when both the lifting arms of said tractor are raised, said chute being tiltable to change the level of its delivery end when only one of the lifting arms of said tractor is raised or lowered, a belt extending along said chute, and flexible and extensible means operated by the power take-off of said tractor for moving said belt to convey produce through said chute, said flexible and extensible means being operative to move said belt when said conveyer is lifted and lowered to various positions and when said chute is tilted to various positions.

2. A portable elevating conveyer adapted to be transported by and operated by a tractor having a pair of lifting arms with means for raising and lowering both said lifting arms and means for raising and lowering one only of said lifting arms and also having a power take-off, said portable elevating conveyer including a chute, a frame supporting said chute, means for pivotally connecting said frame to the lifting arms of said tractor, steadying linkage for connecting said supporting frame to the frame of said tractor, said chute extending transversely of the path of movement of said tractor when said supporting frame is connected to the lifting arms of said tractor and is connected by said steadying linkage to the frame of said tractor, said portable elevating conveyer being bodily liftable when both the lifting arms of said tractor are raised, said steadying linkage operating to shift the center of mass of said portable elevating conveyer forwardly when it thus is lifted, said chute being tiltable to change the level of its delivery end when only one of the lifting arms of said tractor is raised or lowered, a belt extending along said chute, and flexible and extensible means operated by the power take-off of said tractor for moving said belt to convey produce through said chute, said flexible and extensible means being operative to move said belt when said conveyer is lifted and lowered to various positions and when said chute is tilted to various positions.

3. A portable elevating conveyer adapted to be transported by and operated by a tractor having a pair of lifting arms with means for raising and lowering both said lifting arms and means for raising and lowering one only of said lifting arms and also having a power take-off, said portable elevating conveyer including a chute, means for pivotally connecting said chute to the lifting arms of said tractor, steady linkage adapted to be connected to the frame of said tractor, means for pivotally connecting said chute to said steadying linkage, the construction being such that said chute, when connected to said lifting arms and said steadying linkage, extends transversely to the path of movement of said tractor, a belt extending along said chute, and means operable by the power take-off of said tractor to move said belt to convey produce through said chute.

4. A portable elevating conveyer adapted to be transported by and operated by a tractor having a pair of lifting arms with means for raising and lowering both said lifting arms and means for raising and lowering one only of said lifting arms and also having a power take-off, said portable elevating conveyer including a chute, means for pivotally connecting said chute to the lifting arms of said tractor, steadying linkage adapted to be connected to the frame of said tractor, means for pivotally connecting said chute to said steadying linkage, the construction being such that said chute, when connected to said lifting arms and said steadying linkage, extends transversely to the path of movement of said tractor, said chute being bodily liftable when both the lifting arms of said tractor are raised and being tiltable to change the level of its delivery end when only one of the lifting arms of said tractor is raised or lowered, a belt extending along said chute, and flexible and extensible means operable by the power take-off of said tractor to move said belt to convey produce through said chute, said flexible and extensible means being operative to move said belt when said chute is lifted and lowered and tilted to various positions.

ARNOLD A. KUBITZ.